March 9, 1971  C. S. KASPER  3,568,292
DEVICE FOR ASSEMBLING VALVE PARTS
Filed Aug. 15, 1969  8 Sheets-Sheet 3

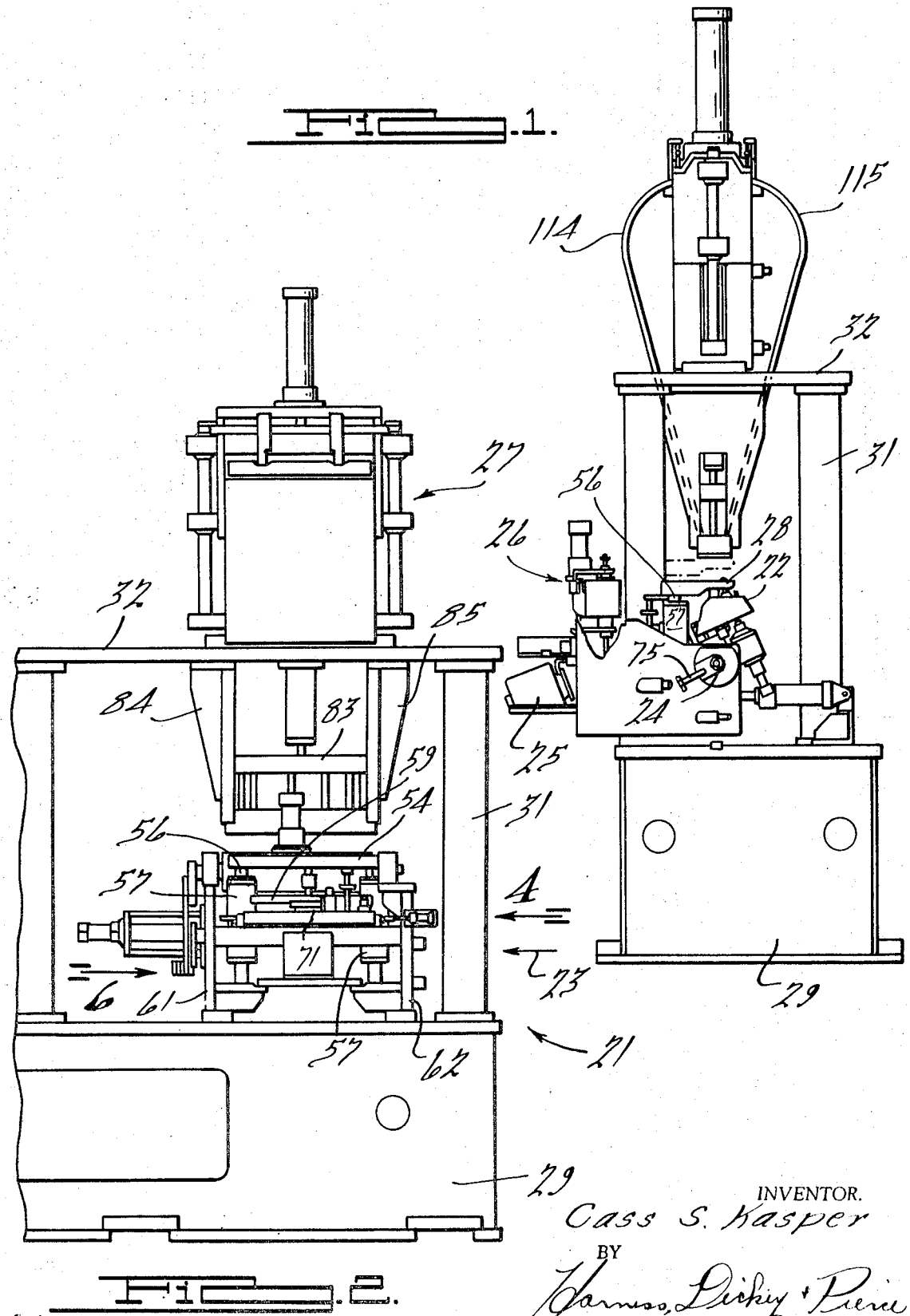

INVENTOR.
Cass S. Kasper
BY
Harness, Dickey + Pierce
ATTORNEYS.

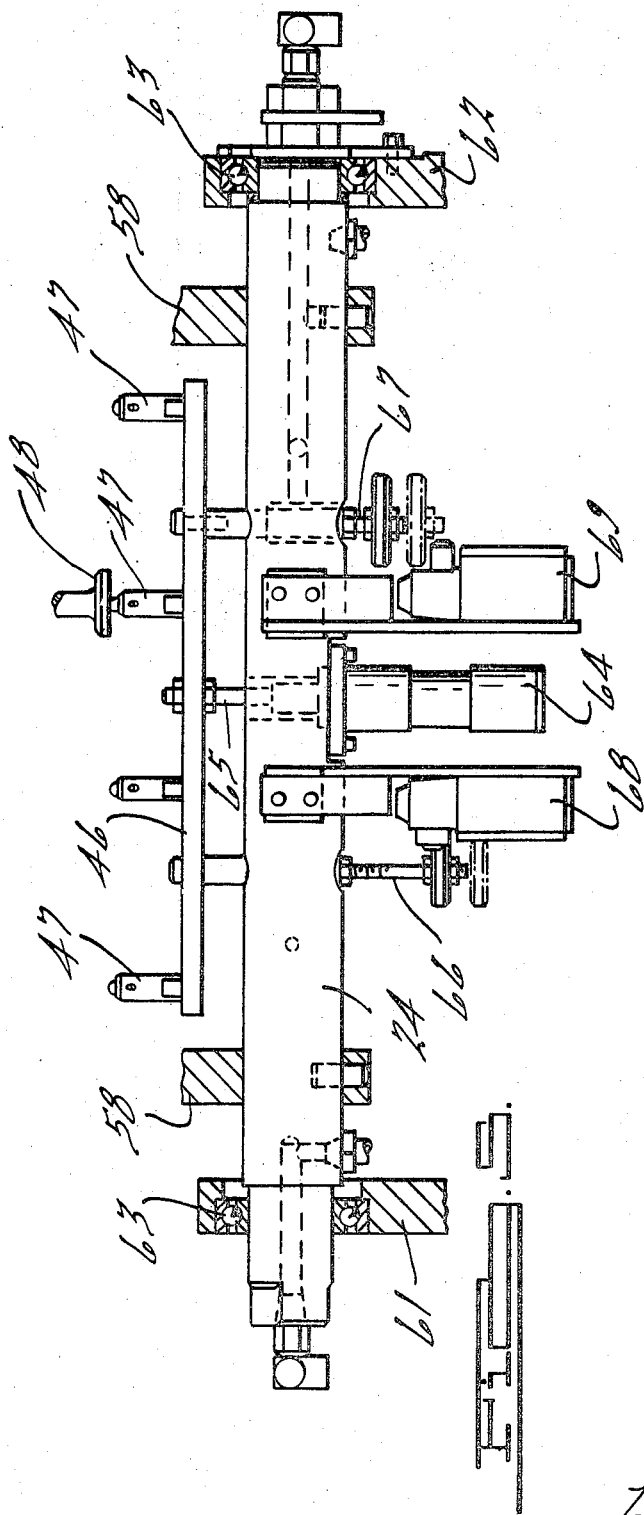

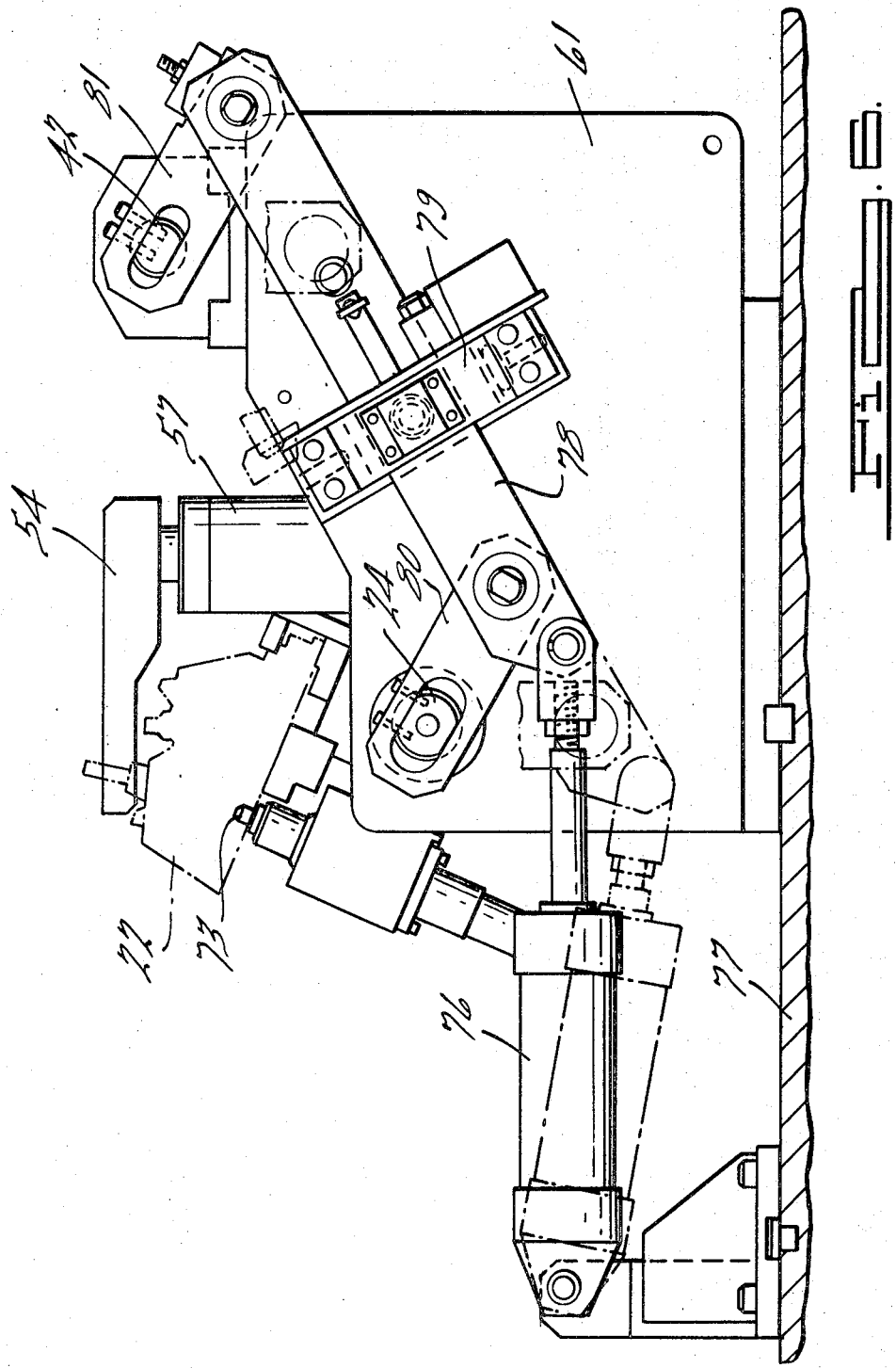

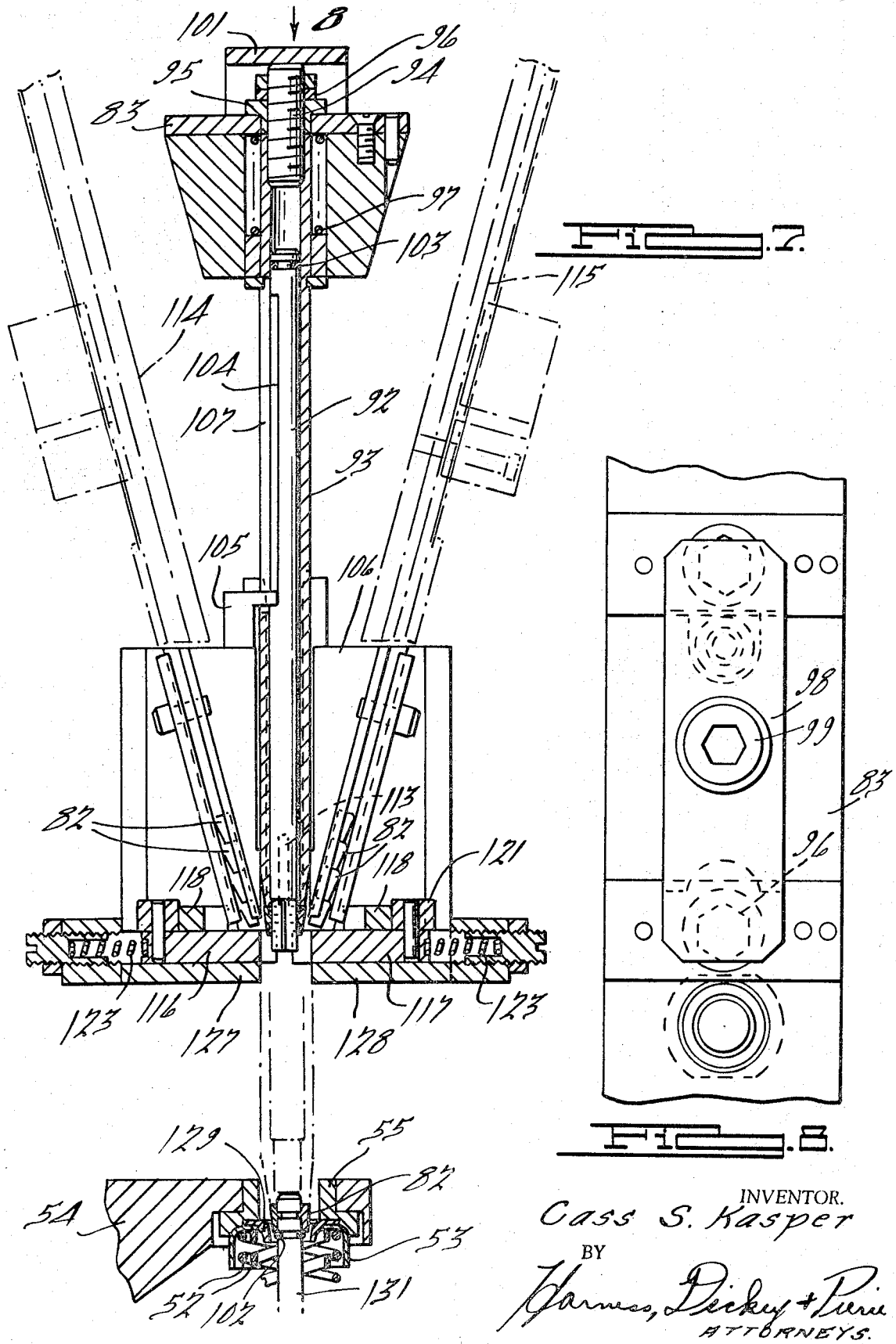

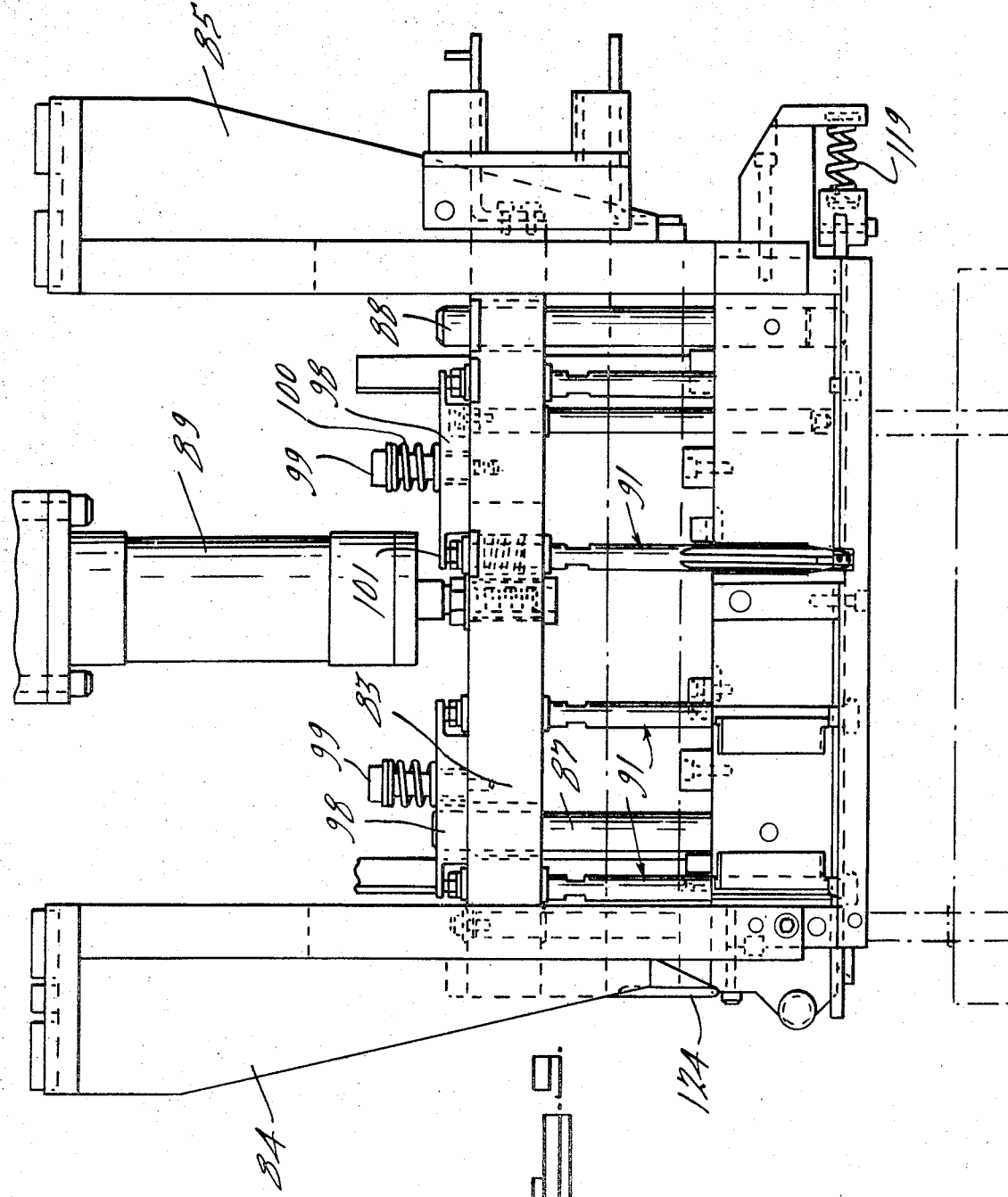

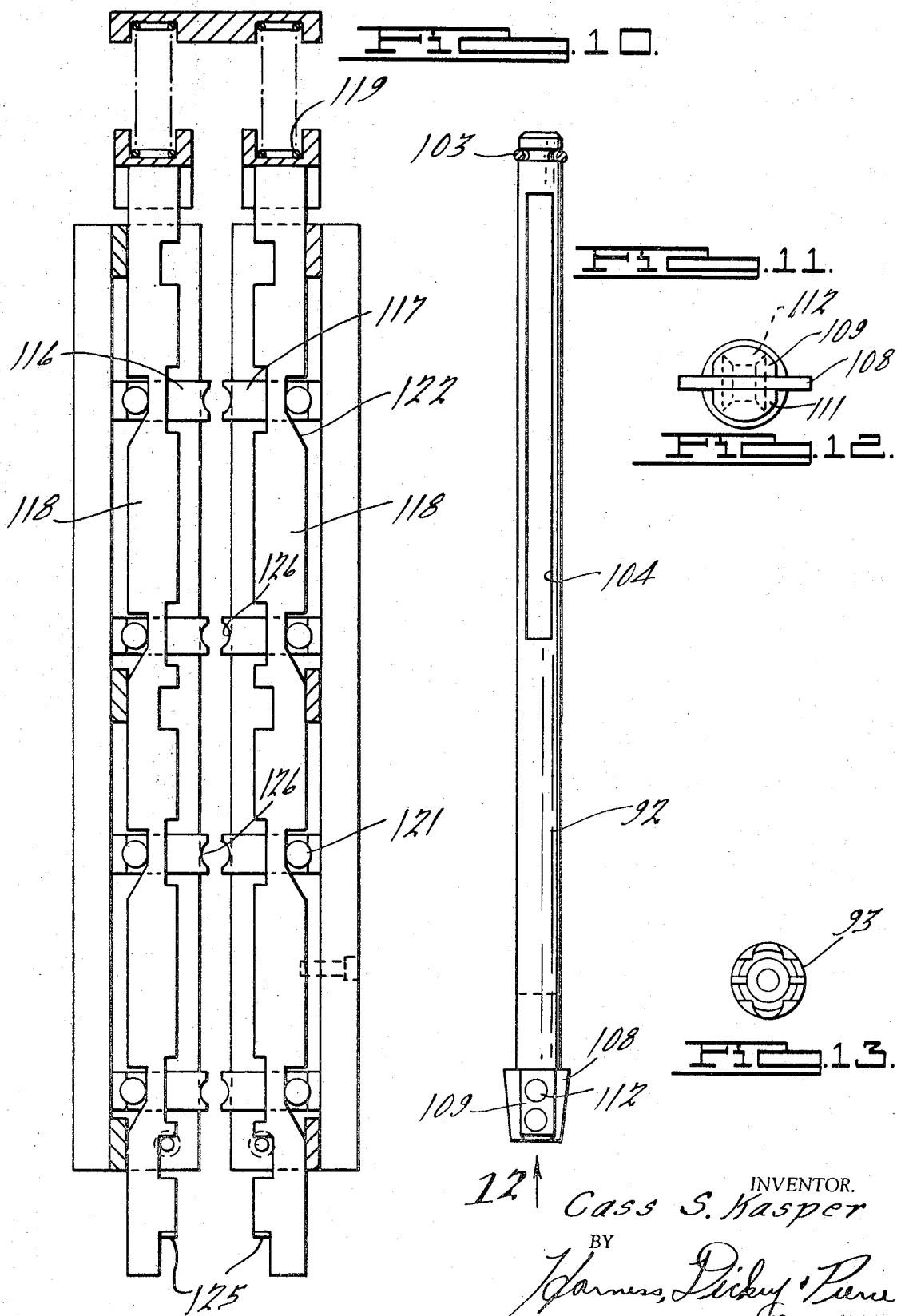

ated Mar. 9, 1971

United States Patent Office 3,568,292

3,568,292
DEVICE FOR ASSEMBLING VALVE PARTS
Cass S. Kasper, Grosse Pointe, Mich., assignor to Inter-Lakes Engineering Co., Mount Clemens, Mich.
Filed Aug. 15, 1969, Ser. No. 850,614
Int. Cl. B23p 19/04
U.S. Cl. 29—208     15 Claims

ABSTRACT OF THE DISCLOSURE

A machine for automatically assembling O-rings and spring retainer locking keys on valve stems of internal combustion engines. A cylinder head carrying valves is advanced to a station where, with the valve spring retainers held down, the head is rocked to a position for receiving the O-rings. These are picked up by spindles which rock between O-ring pick-up and mounting positions. The head is then swung back to a position to receive the keys. Pairs of keys are fed onto the inner of two telescoping quills and magnetically held thereon while the quills reciprocate to mount the keys in place.

BACKGROUND OF THE INVENTION

Field of the invention

The invention relates to the assembly of internal combustion engines and particularly to the mounting of O-rings and spring retainer locking keys on valve stems in an automatic manner.

Description of the prior art

A device for assembling these parts is shown in U.S. Pat. No. 3,377,691, issued Apr. 16, 1968. The present invention has a number of advantages over this previous construction in terms of simplicity, usefulness and accessibility.

BRIEF SUMMARY OF THE INVENTION

According to the invention, cylinder heads having valves assembled therein with springs and spring retainers on the valve stems, are fed along a track to an O-ring and key loading station. At this station, fingers engage the undersides of the valves holding them against their seats, while a clamp engages the retaining rings and compresses the springs, thus exposing the O-ring slots. The O-rings are fed from a vibratory feeder into position to be picked up by reciprocable spindles. The cylinder head, with its fingers and clamp, rocks toward the spindles while at the same time the spindles rock on a separate axis toward the cylinder head, so that the spindles and valve stems become aligned. At this point, the O-rings are fed onto the valve stems by a construction shown in the above-mentioned patent. The spindles then go back to pick up another set of O-rings while the cylinder head swings back to receive the locking keys.

The latter are fed by pairs of coaxial inner and outer quills mounted above the cylinder head. Pairs of keys are fed through chutes to opposite sides of a pair of magnets carried by the inner quill. The quills descend and the outer quill strips the keys from the magnets onto the stem, the quills then retracting along with the clamp which permits the spring retainer to engage the locked keys. The cylinder head is then freed to advance to the next station.

BRIEF DESCRIPTION OF THE DRAWINGS

FIG. 1 is a side elevational view of a machine embodying the principles of this invention;

FIG. 2 is a front elevational view of the machine;

FIG. 5 is a fragmentary cross-sectional view taken along the line 5—5 of FIG. 4 and showing the rocking shaft which supports the cylinder head carriage, the valve engaging fingers and the spring retainer clamp;

FIG. 6 is a side elevational view of the means for rocking the cylinder head carriage and O-ring mounting means, taken in the direction of the arrow 6 of FIG. 2;

FIG. 7 is a cross-sectional view of the quills for feeding the keys onto the valve stem;

FIG. 8 is a fragmentary top plan view showing the means for driving the quills, taken in the direction of the arrow 8 of FIG. 7;

FIG. 9 is a front elevational view of the quill assembly;

FIG. 10 is a top plan view of the means for feeding the keys from the chutes onto the magnets of the quills;

FIG. 11 is a side elevational view of one of the inner quills;

FIG. 12 is a bottom plan view of the quill of FIG. 11 taken in the direction of the arrow 2 thereof; and FIG. 13 is a bottom plan view of the outer quill.

DESCRIPTION OF THE PREFERRED EMBODIMENT

Figure 3:
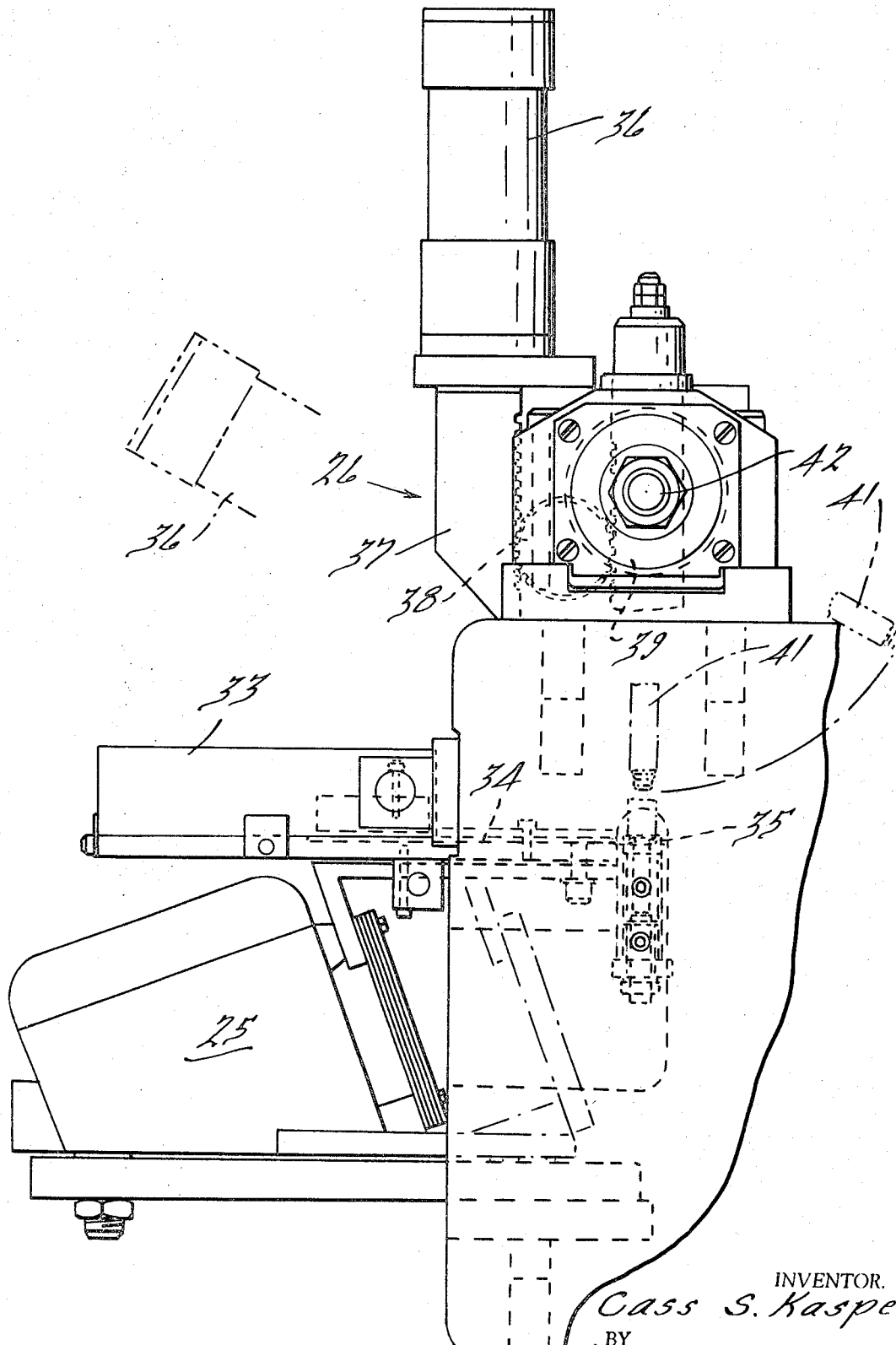
FIG. 3 is a side elevational view of the vibratory feeder and the mechanism for picking up and transferring the O-rings.

The machine station for assembling the O-rings seals and spring retainer locking keys is shown in FIGS. 1 and 2 and is generally indicated at 21. The cylinder heads 22 are fed in the direction of the arrow 23 from the previous station on fixed tracks (not shown). When each cylinder head arrives at station 21, it arrives on movable track sections which swing counterclockwise in FIG. 1 on a rocking shaft 24. O-rings are fed by a vibratory feeder 25 toward the cylinder head, and an O-ring pickup and assembly device, generally indicated at 26, swings counterclockwise from its FIG. 1 position, in which it picks up O-rings, to a position in which it places these O-rings on the valve stems projecting from the cylinder head. The cylinder head is then swung clockwise to the FIG. 1 position, while the assembly 26 swings back to its FIG. 1 position to pick up the next set of O-rings.

With cylinder head 22 back in its FIG. 1 position, a pair of semicircular locking keys are placed on each valve stem by a key assembling mechanism generally indicated at 27. Clamps 28, which have been holding down the spring retainers during the O-ring and key assembling operations, are then lifted to permit the valve springs to urge the spring retainers against the keys. The latter are wedged inwardly by the spring retainers, being held in position by slots on the valve stems which receive ridges formed on the keys.

This general description of the operation of the machine at station 21 is merely intended to convey an overall view of the functions of the invention. The machine rests on a base 29 which supports feeder 25, O-ring assembling mechanism 26 and rocking shaft 24 together with its associated parts. Columns 31 support a platform 32 which carries key assembling mechanism 27.

Vibratory feeder 25 feeds the O-rings from a bin 33 into four guide slots 34, where they will arrive at the position indicated at 35 in readiness for pickup by unit 26. This unit comprises a cylinder 36 which operates a rack 37, this rack driving a gear 38 which in turn drives a rack 39. The last-mentioned rack operates four O-ring pickup and mounting units 41 which are similar in consruction to that shown in FIGS. 5 and 6 of the aforementioned Pat. No. 3,377,691 and described from column 5, line 30 to column 6, line 33 thereof. The entire assembly 26, including parts 36, 37, 38, 39, and 41, rotates about a shaft 42 so that units 41 will move between the single dot dash and the double dot-dash positions of FIG. 3. With four O-rings at position 35, rack 37 will be lifted to cause units 41 to descend, picking up the O-rings. Units will then be retracted and assembly 26 will be swung to its O-ring mounting position.

Figure 4:
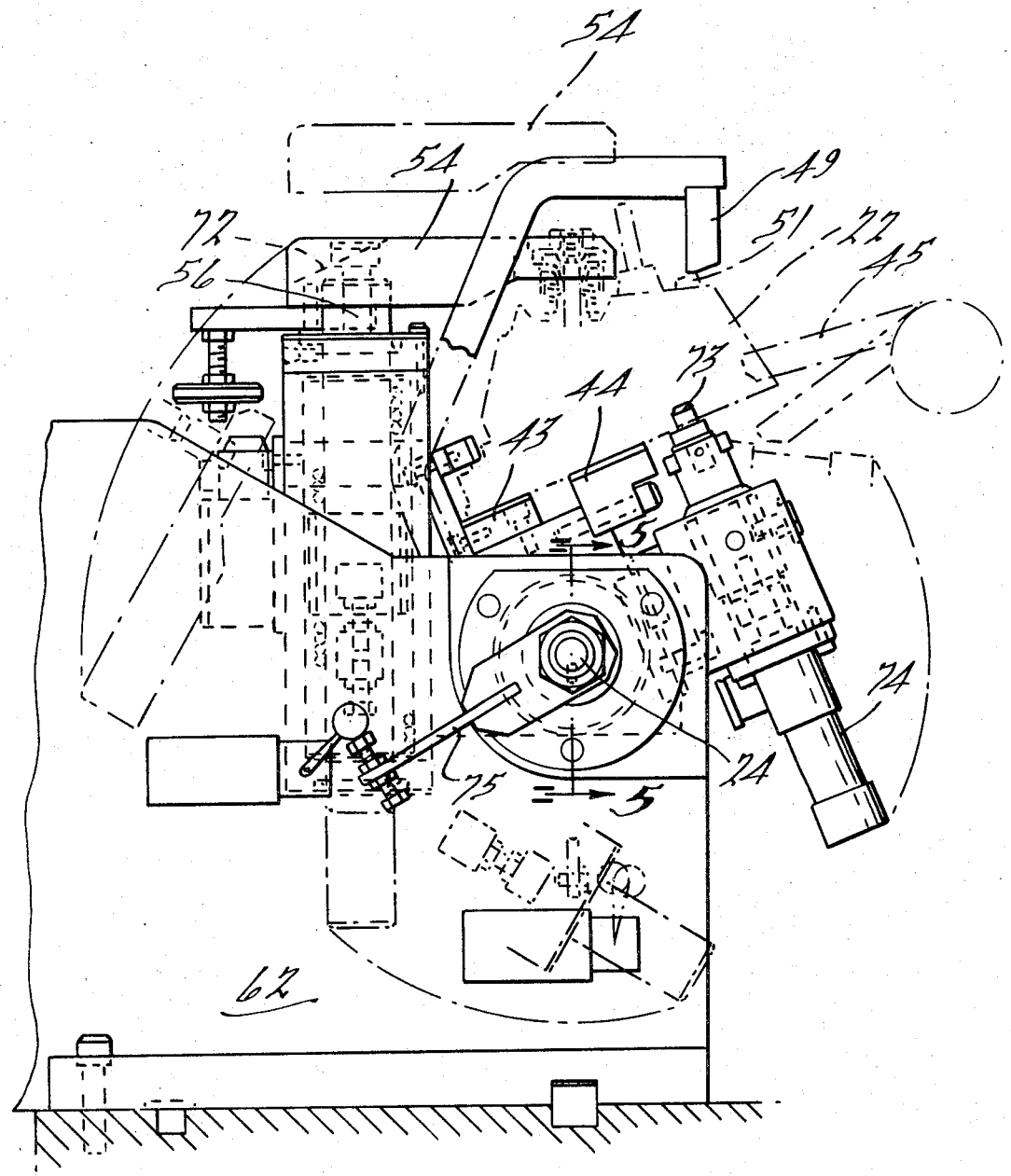
FIG. 4 is a side elevational view of the means for locating the cylinder head and retracting the spring retainers from the O-ring slots, taken in the direction of the arrow 4 of FIG. 2.

FIG. 4 shows cylinder head 22 supported by movable track sections 43 and 44 which, in the position shown, are aligned with the fixed tracks, but which are rockable with shaft 24. The cylinder head is advanced onto the movable tracks by transfer fingers 45 which are rockable between the dot-dash and double-dot-dash positions shown as they move back and forth (in and out of the paper in FIG. 4) to pick up each successive cylinder head. Shaft 24 is shown in FIG. 5 and carries a bar 46 on which is mounted four valve engaging fingers 47. These fingers engage the undersides of valves 48 which are mounted in the cylinder head, holding the valves against their seats. To resist this outward movement, a hold-down member 49 carried by shaft 24 engages a plurality of projections 51 on the cylinder head.

At this time the four valves 48 have assembled on their stems springs 52, spring retainers 53, and possibly key retaining members 129 (see FIG. 7). A clamping plate 54 is provided for holding down these parts so that the O-rings and keys may be mounted on the valve stems. Clamping plate 54 has four locating inserts 55 therein which are adapted to receive parts 53 and 129 when the clamp descends from its dot-dash position to its solid line position in FIG. 4. The clamp is mounted on a pair of rods 56 seen in FIG. 1, these rods being mounted in ball bearing trunnions 57. The trunnions are secured to shaft 24 by members 58 shown in FIG. 5. The trunnions are also interconnected by a member 59 seen in FIG. 2. Shaft 24 is rockably mounted between a pair of end brackets 61 and 62 by means of bearings 63 (FIG. 5).

The means for actuating fingers 47 comprises a fluid actuated motor carried by the central portion of shaft 24, piston 65 of this motor being connected to bar 46. A pair of limit switch actuators 66 and 67 are mounted on bar 46 and actuate limit switches 68 and 69 respectively carried by shaft 24.

Clamp 54 is actuated by a piston and cylinder motor 71 which is mounted on cross member 59. Four inclined clearance slots 72 (FIG. 4) are provided in clamp 54 for clearing the O-ring applying mechanism 41 when the devices are swung during operation.

Also provided at the station are a pair of locators 73 (FIG. 4) which fit in holes in cylinder head 22 to locate the cylinder head in position for the assembling operation. These locating pins are actuated by fluid-operated pistons and cylinders 74 mounted on shaft 24. Also carried by shaft 24 is a limit switch actuator 75 seen in FIG. 4 to control the position of the rocking shaft.

The means for actuating shaft 24 as well as O-ring mounting mechanism 26 is seen in FIG. 6 and comprises a fluid-actuated piston and cylinder 76 mounted on a base 77 which supports end plates 61 and 62. This piston and cylinder is connected to a link 78 which is guided at 79. Link 78 forms part of a parallelogram linkage comprising short links 80 and 81, link 80 being mounted on shaft 24 while link 81 is mounted on shaft 42. The arrangement is such that when the piston and cylinder moves from its solid line or extended position to its dot-dash line or retracted position in FIG. 6, both shafts 24 and 42 will swing clockwise to bring the valve stems in line with the O-ring loading means 41. Extension of piston and cylinder 76 will return the O-ring mounting means 41 to its O-ring pick up position and cylinder head 22 in position for receiving keys 82 which lock spring retainer 53 in position.

The means for mounting keys 82 is best seen in FIGS. 7 to 13. Key feeding means 27 comprises a bar 83 mounted for vertical movement between guides 84 and 85 which are suspended from platform 32 (FIG. 2). Bar 83 is also guided by a pair of guide bars 87 and 88 and is actuated by a piston and cylinder 89 suspended from platform 32. Bar 83 carries pairs of inner and outer quills, generally indicated at 91. Each pair of quills comprises an inner quill 92 and an outer quill 93 (FIGS. 7 and 11 to 13). Outer quill 93 is secured at its upper end to plate 83 by a stud 94 extending through a bushing 95 and carrying a nut and washer 96 which are urged against bushing 94 by a spring 97. A hold-down member 98 is mounted between each pair of quill sets 91 by means of a fastener 99 and a spring 100 which urges member 98 against plate 83. A pair of ears 101 on member 98 engage studs 96 on the two quill sets. Thus, when plate 83 descends, all four quill sets 91 are moved downwardly until outer quills 93 are obstructed, in the manner described below, after which any further descent of plate 83 will cause springs 97 and 100 to compress. The stopping position of outer quill 93 will be that at which keys 82 engage the O-ring 102 on the valve stem and snap into position in their retaining groove (see FIG. 7).

Inner quill 92 is of cylindrical shape and is shorter than quill 93. It has an expanded ring 103 at its upper end which is frictionally engageable with the interior of quill 93 so that the two quills will stay in the same relative axial position unless they are forcibly shifted therefrom. A keyway 104 extends part way along quill 92, and a key 105 is mounted on a fixed member 106 and passes through a slot 107 in quill 93 to be received by keyway 104.

The lower end of quill 92 carries a steel plate 108. A pair of magnets 109 and 111 are secured to the exposed portion of this plate by rivets 112. The curvature of magnets 109 and 111 is such that they will interfit with the concave surfaces of semi-cylindrical keys 82 so that the magnets will hold the keys on inner quill 92. The projecting portions of plate 108 (FIGS. 11 and 12) will prevent the keys from slipping out of position on the magnets. These portions of plate 108 will also act as a key between inner quill 92 and outer quill 93, since they are guided in keyways 113 of the outer quill (FIG. 7).

The means for delivering keys 82 to the position where they are picked up by magnets 109 and 111 comprises a pair of inclined chutes 114 and 115 on opposite sides of each pair of quills 91. These chutes lead the keys into close proximity with the magnets when the latter are in their upper position as shown in solid lines in FIG. 7. Means are provided for permitting the lowermost keys to drop from the chutes and then pushing them inwardly onto the magnets. This means includes a pair of shuttles 116 and 117 on the outsides of the lower ends of chutes 114 and 115 respectively. These shuttles are actuated by horizontal cam bars 118 which are driven upwardly from their lower positions seen in the plan view of FIG. 10 to retract the shuttles, and move downwardly in FIG. 10 to allow the shuttles to advance. Cam bars 118 are urged toward their downward position by springs 119 (FIGS. 9 and 10). Shuttles 116 and 117 have rollers 121 which ride in recesses 122 of the cam bars, and springs 123 urge the shuttles toward magnets 109 and 111, thus holding rollers 121 in engagement with recesses 122.

The recesses are inclined so that when the cam bars are moved upwardly in FIG. 10 rollers 121 will move outwardly, thus withdrawing shuttles 116 and 117 outwardly from their solid line position in FIGS. 7 and 10. The means for actuating cam bars 118 to their upper position in FIG. 10 comprises a pair of cams 124 carried by one end of plate 83 (FIG. 9) and engaging recesses 125 at the ends of the cam bars (FIG. 10).

When in their solid line position of FIG. 7, shuttles 116 and 117 support the lowermost of the two stacks of keys 82. When the shuttles are withdrawn, these lowermost keys will drop down into recesses 126 of the shuttles and will rest on platforms 127 and 128. When shuttles 116 and 117 are next advanced, they will push these lowermost keys inwardly until they engage magnets 109 and 111.

The operation of the entire mechanism will now be described. Cylinder head 22 having arrived on track sections 43 and 44 and being located by pins 73, fingers 47 will press valves 48 against their seats in the cylinder head, this movement being resisted by members 49. Clamp 54 will then descend and will expose the grooves for O-rings 102 and keys 82 by compressing spring retainer 53 and springs 52. In addition to spring retainer 53, a separate key retaining member 129 may also be provided, in which case this member will also be compressed by clamp 54. Retaining member 129 (or spring retainer 53) will have a frustoconical inner surface engageable with the keys to wedge them against the valve stem. While this clamping action is taking place, O-ring mounting means 41 will be driven downwardly in FIG. 3 until they pick up O-rings 102 being fed along track 34 by vibratory feeder 25. Means 41 will then be lifted in readiness for transfer of the O-rings.

Cylinder head 22 and O-ring mounting means 41 will then be swung toward each other by the motor and linkage shown in FIG. 6, this swinging being clockwise in FIG. 6 and counterclockwise in FIGS. 1, 3 and 4. When the O-ring mounting means 41 is aligned with the valve stems, this mounting means will again be driven outwardly by motor 36 so that the O-rings are mounted on the valve stems. The O-ring mounting means will then be retracted and swung back to its vertical position shown in FIG. 3 while the cylinder head is swung back to its position shown in FIGS. 1 and 4.

Quill sets 91 will then descend by means of motor 89. These quill sets will carry pairs of keys on magnets 109 and 111, the keys having been placed there during the previous reciprocation of shuttles 116 and 117. When the bottom of magnets 109 and 111 together with the bottom of plate 108 engages the top of valve stem 131 (FIG. 7) movement of the inner quill will stop. The outer quill, however, will continue to descend and will strip keys 82 from the magnets and slide them onto the valve stem. The total diameter across magnets 109 and 111 is the same as that of valve stem 131 so that this transition will be smooth. The outer quill will continue to descend until the keys engage the O-ring at which time the ridges on the keys will also fit within a slot on valve stem 31 provided for that purpose. Any overtravel of outer quill 93 will be accommodated by springs 97 and 100.

As the quills descend, cams 124 will also descend and will move cam bars 118 from their lower position shown in FIG. 10 to their upper position. This will retract shuttles 116 and 117, permitting the next sets of keys to be dropped onto platforms 127 and 128.

When bar 83 is lifted together with the quill sets, clamp 54 will also be lifted, releasing spring retainer rings 53, key engaging rings 129 (if present) and springs 52 on the valve stems so that valve springs 52 urge the key retaining rings against the keys. As mentioned above, the key retaining rings (or spring retainer members 53) are tapered so that the keys will be wedged against the valve stem. The ascent of bar 83 will also permit springs 119 to move cam bars 118 to their lower positions as seen in FIG. 10, thus permitting springs 123 to move shuttles 116 and 117 inwardly, causing the next sets of keys 82 to be pushed against the sides of outer quills 93. These sides are shaped, as seen in FIGS. 7 and 13, so that the keys will ride on them until the outer quills are completely withdrawn upwardly, at which time magnets 109 and 111 of the inner quills will be exposed so that the keys will be pushed onto them. Inner quills 92 will be lifted along with outer quills 93 by virtue of the expanded rings 103, until keys 105 engage the bottoms of keyways 104. Further ascent of quills 93 beyond this point will cause quills 92 to move downwardly relative to quills 93 until the position of FIG. 7 is reached, exposing magnets 109 and 111 for receipt of keys 82. Cylinder head 22 will be released by locating pins 73 and may be transferred out of the station by fingers 45.

What is claimed is:

1. In a device for assembling O-rings and retaining keys on the valve stems of a cylinder head, cylinder head supporting means rockable between an O-ring receiving position and a key receiving position, O-ring mounting means rockable between an O-ring pickup position and an O-ring mounting position, means feeding O-rings into position for pickup by said O-ring mounting means when in its pickup position, means operative when said cylinder head supporting means is in its key receiving position for holding said valves against their seats and for clamping springs and spring retainers on said valve stems in a compressed position to expose slots on the valve stems which are to receive the O-rings and keys, means for simultaneously rocking said cylinder head supporting means from its key receiving position to its O-ring receiving position and said O-ring mounting means from its O-ring pickup position to its O-ring mounting position, means for advancing said O-ring mounting means towards said valve stems to mount the O-rings in position on the valve stems, means for returning said O-ring mounting means to its pickup position and said cylinder head supporting means to its key receiving position, and means at said key receiving position feeding pairs of keys onto said valve stems.

2. The combination according to claim 1, said last-mentioned means comprising a pair of telescoping quills for reciprocation between retracted and advanced positions, chutes on opposite sides of said quills containing stacked keys, magnet means at the lower end of the inner quill for holding keys thereon, and shuttle means advancing the lowermost keys in said stacks onto said magnet means when the quills are in their retracted position.

3. The combination according to claim 2, said inner quill having a frictional connection with said outer quill whereby the outer quill will continue to advance after the inner quill engages the top of the valve stem to strip the keys held by said magnets from the magnet means onto said valve stem.

4. The combination according to claim 3 further provided with a lost motion connection between said inner quill and a stationary portion of said device, whereby lifting of said outer quill after said keys have been placed on the valve stem will cause said inner quill to be lifted through said frictional connection until said lost motion connection stops said inner quill, whereby further movement of said outer quill will cause said magnet means to be exposed.

5. The combination according to claim 2 said magnet means comprising a pair of semicircular magnets and a fence exposed between said magnets for preventing the keys held thereon from slipping out of position.

6. The combination according to claim 2, said shuttle means comprising a pair of reciprocable shuttles spring-urged toward said magnet means and reciprocable cam bars connected with said shuttles, movement of said cam bars to one position causing retraction of said shuttles whereby the lowermost of said stacked keys will drop into position for advancement onto said magnets by said shuttles.

7. The combination according to claim 2, further provided with a bar on which a plurality of pairs of inner and outer quills are mounted, a reciprocable motor for actuating said bar, and spring connections between said outer quills and said bar, whereby the advancement of said bar beyond the point at which said outer quill places said keys in position on said valve stems will be permitted.

8. The combination according to claim 1, said cylinder head supporting means comprising a rockably mounted shaft and track sections carried by said shaft, said clamping means comprising a clamp bar supported by rods which are reciprocably guided in trunnions carried by said rocking shaft.

9. The combination according to claim 8, said means for holding said valves against said valve seats comprising fingers mounted on a bar and reciprocable motor means for actuating said bar, the motor means being carried by said rocking shaft.

10. The combination according to claim 8, further provided with a locating pin for engagement with said cylinder head, said locating pin being carried by said rocking shaft, and reciprocable motor means for actuating said locating pin.

11. The combination according to claim 1, said means for feeding O-rings into position for pickup comprising a vibratory feeder and a bin for carrying the O-rings, tracks leading from said bin to O-ring pickup positions, said means for advancing and retracting said O-ring mounting means comprising a reciprocable motor, a rack connected to said motor, a rack connected to said O-ring mounting means and a gear connecting said racks.

12. In a device for assembling pairs of spring retainer locking keys on valve stems assembled in cylinder heads, telescoping inner and outer quills, the inner quill carrying magnet means for holding said keys, means for reciprocating said outer quill, a frictional connection between the inner and outer quills, chutes on opposite sides of said quills containing stacks of keys, shuttles beneath said chutes movable between inner positions blocking the lowermost of said stacks and withdrawn positions permitting the lowermost keys to drop, platforms for supporting the lowermost keys when so dropped whereby return of the shuttles to their inner positions will push the keys against the magnet means, so that advancement of said outer quill will cause said inner quill also to advance through said frictional means until the magnet means engages the top of the valve stem after which the outer quill will continue to advance and strip the keys from the magnet means onto the valve stems.

13. The combination according to claim 12, said magnet means comprising a pair of semicylindrical magnets separated by a fence to prevent keys carried by said magnets from slipping out of position.

14. The combination according to claim 12, further provided with means responsive to arrival of said outer quill at its advanced position for causing said shuttles to retract, thereby permitting the next set of keys to drop into position for loading onto said magnet means and means responsive to withdrawal of said outer quill from its advanced position for advancing such shuttles.

15. The combination according to claim 14, further provided with cam bars for actuating said shuttles, said cam bars being spring-urged to a position in which said shuttles are permitted to advance, springs urging said shuttles to their advanced positions, surfaces on said outer quill permitting said keys to ride on the outer quill until the outer quill has reached its withdrawn position, and a lost motion connection between a stationary portion of said device and said inner quill, whereby the inner quill will be held in such position that its magnet means are exposed when the outer quill is completely withdrawn so that the keys may be pushed onto the magnet means.

References Cited
UNITED STATES PATENTS

| | | | |
|---|---|---|---|
| 3,239,925 | 3/1966 | Piper | 29—249X |
| 3,315,339 | 4/1967 | Young | 29—249 |
| 3,377,691 | 4/1968 | Kasper et al. | 29—235X |

THERON E. CONDON, Primary Examiner

E. F. DESMOND, Assistant Examiner

U.S. Cl. X.R.

29—235, 249